United States Patent [19]

Bell et al.

[11] 4,327,886

[45] May 4, 1982

[54] INTEGRAL ROCKET RAMJET MISSILE

[75] Inventors: Alfred J. Bell, Silver Spring; Albert S. Polk, Jr., Baltimore; Lester Cronvich, Columbia; Everett J. Hardgrave, Jr., Silver Spring, all of Md.

[73] Assignee: The United States of America as represented by the Secretary of the Navy, Washington, D.C.

[21] Appl. No.: 312,076

[22] Filed: Nov. 30, 1972

[51] Int. Cl.³ .............................................. F42B 15/16
[52] U.S. Cl. .................................... 244/3.29; 60/245; 60/251; 60/270 R; 137/15.1; 239/265.15
[58] Field of Search ................ 60/225, 245, 26.1, 271, 60/270 R; 244/3.21, 3.29; 239/265.15; 137/15.1

[56] References Cited

U.S. PATENT DOCUMENTS

| | | | |
|---|---|---|---|
| 2,497,084 | 2/1950 | Irby | 60/26.1 |
| 2,780,961 | 2/1957 | Musser et al. | 60/26.1 |
| 2,987,875 | 6/1961 | Fox | 60/245 |
| 3,040,517 | 6/1962 | Ryden et al. | 60/225 |
| 3,086,359 | 4/1963 | Davis | 60/225 |
| 3,141,297 | 7/1964 | Shields | 60/271 |
| 3,276,332 | 8/1966 | Jaffe | 244/3.21 |
| 3,403,873 | 10/1968 | Bell et al. | 244/3.21 |
| 3,482,403 | 12/1969 | Polk, Jr. | 60/245 |
| 3,588,004 | 6/1971 | Suter | 244/3.29 |
| 3,659,424 | 5/1972 | Polk, Jr. | 60/245 |

*Primary Examiner*—Stephen C. Bentley
*Attorney, Agent, or Firm*—R. S. Sciascia; A. L. Branning

[57] ABSTRACT

A two-stage aerial vehicle which is launched and accelerated by an integral solid booster. After booster burnout and jettison of the booster nozzle, the booster chamber becomes the combustion chamber for a liquid fueled ramjet. The vehicle is designed for use with known guided missile launching systems and employs unique ram air scoop and control surface actuator structure.

10 Claims, 18 Drawing Figures

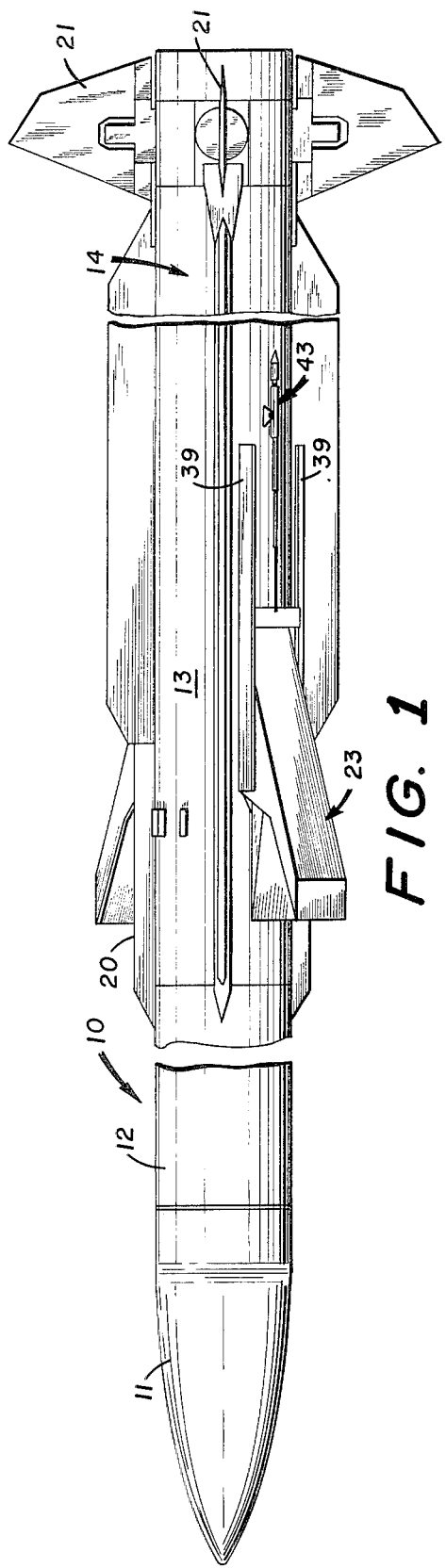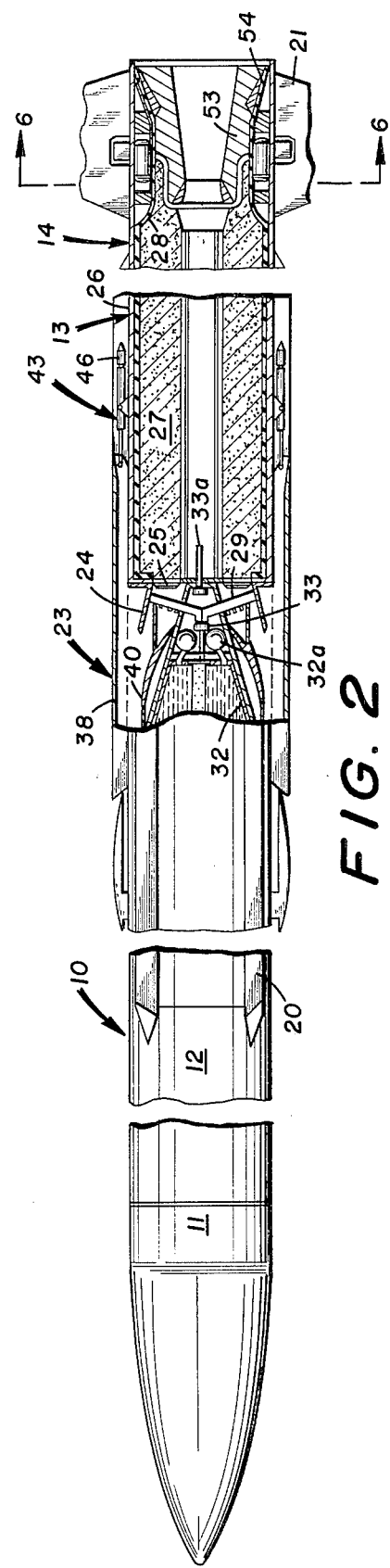

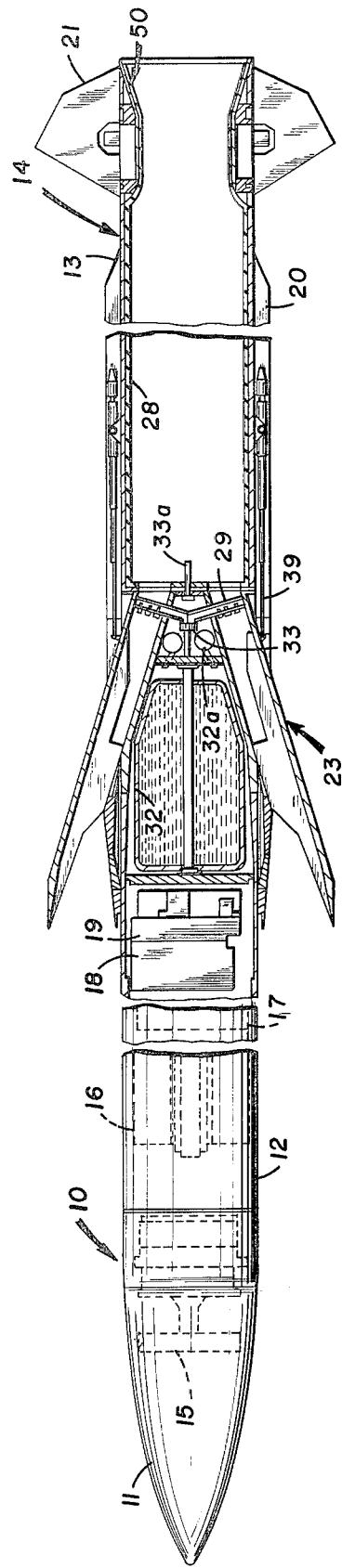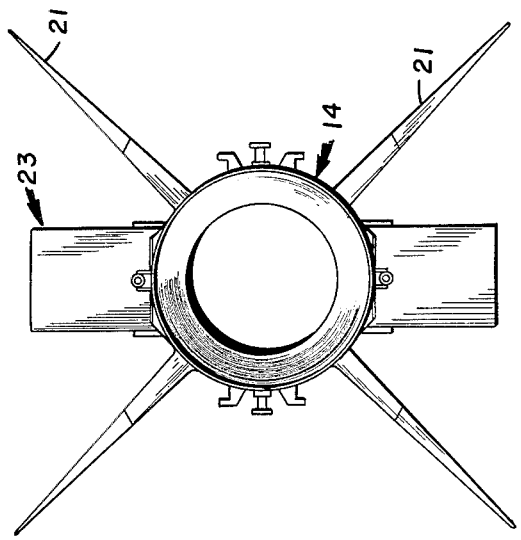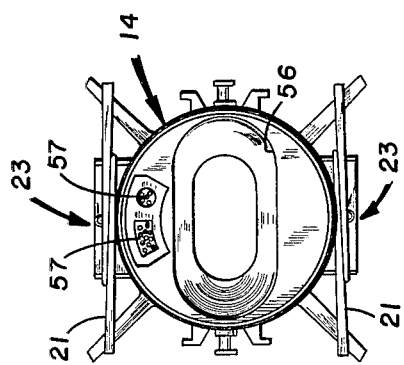

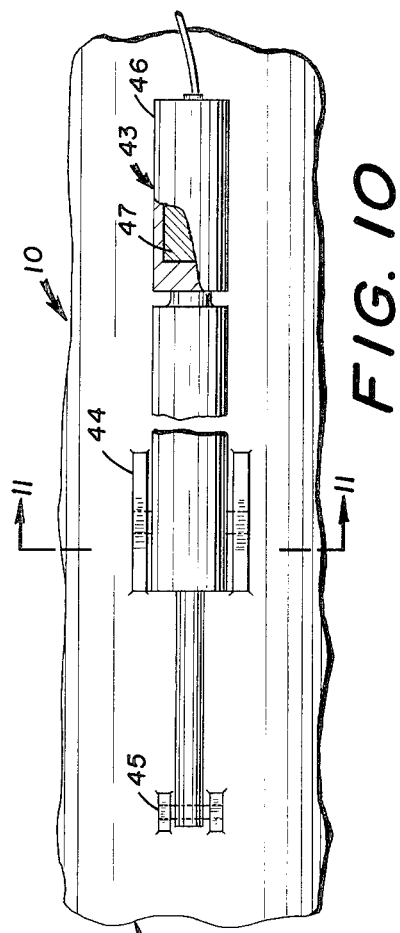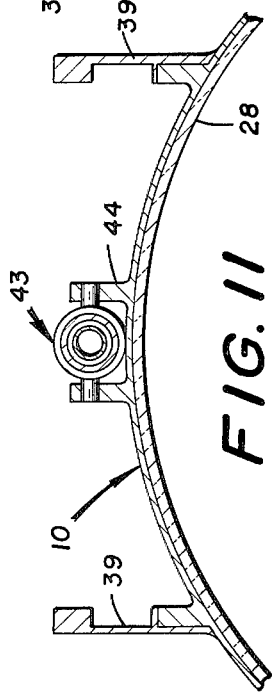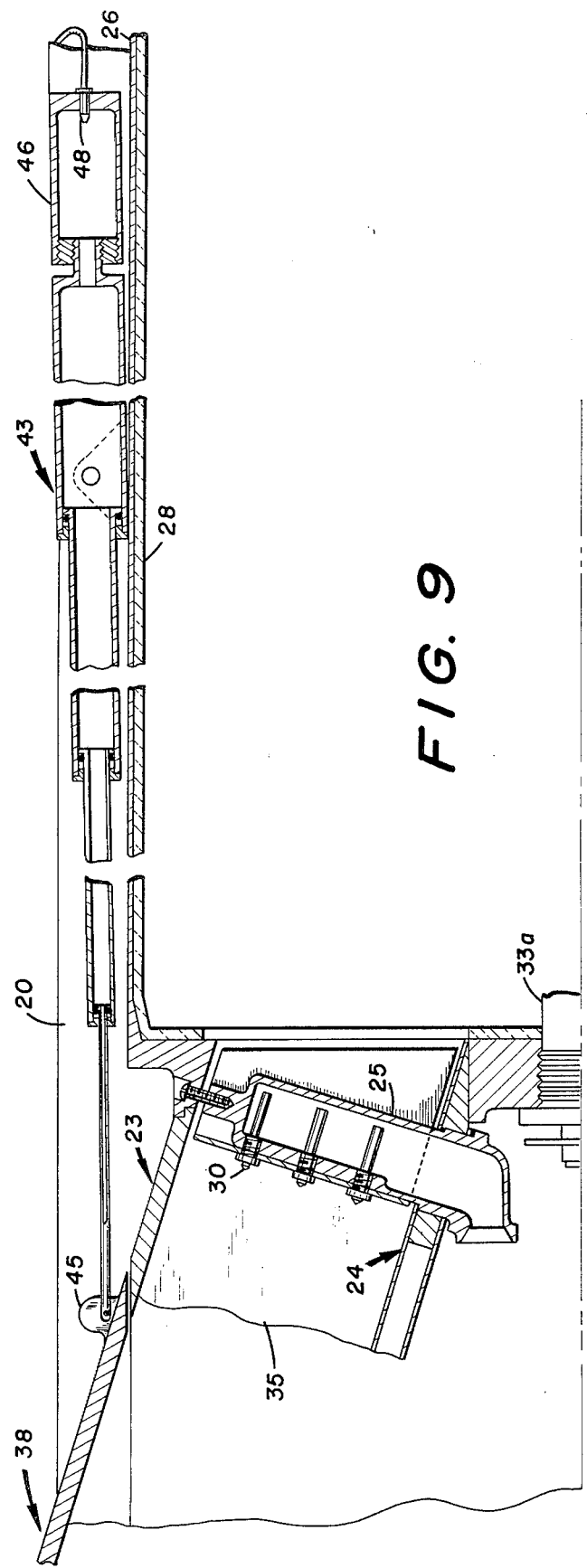
FIG. 10
FIG. 11
FIG. 9

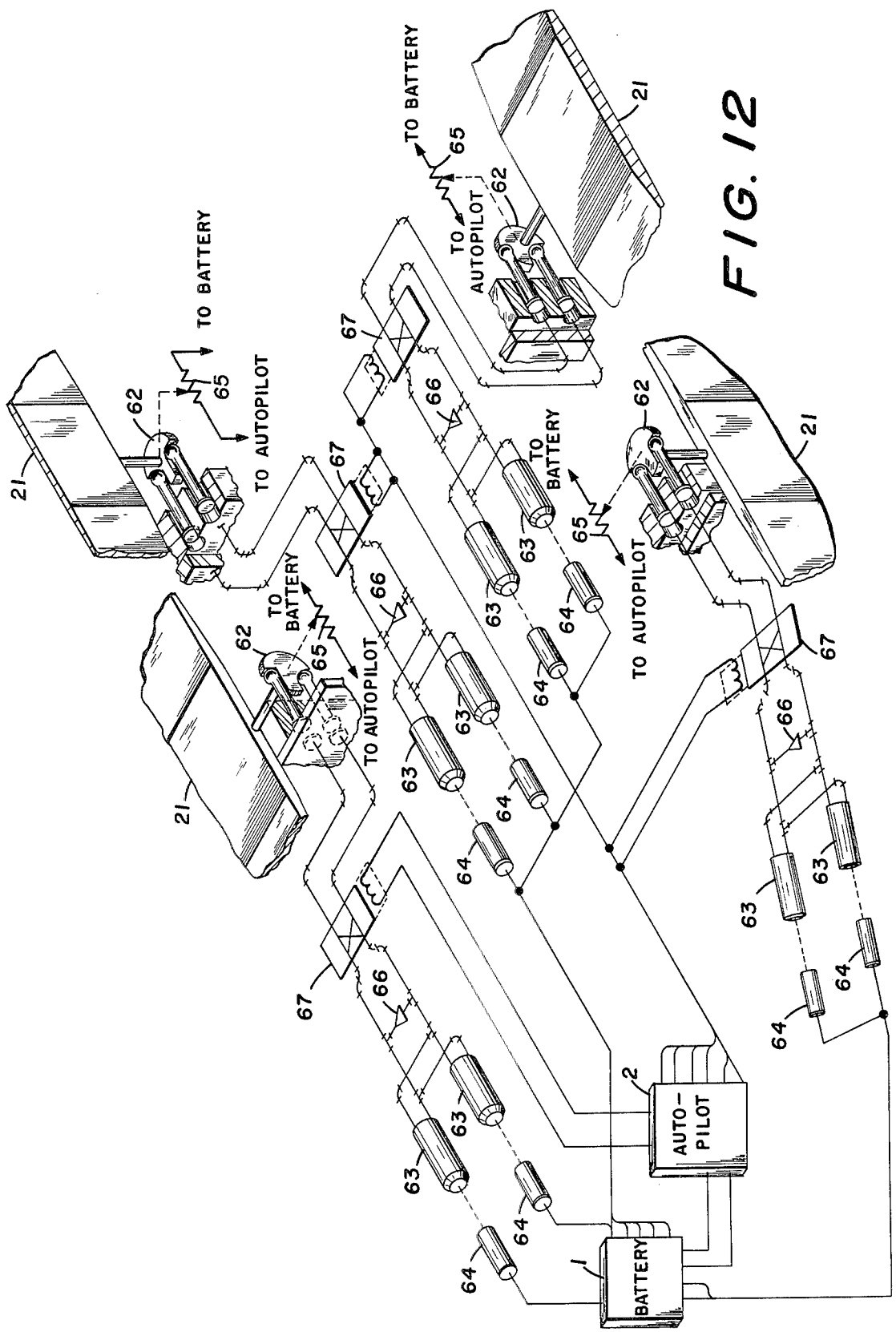

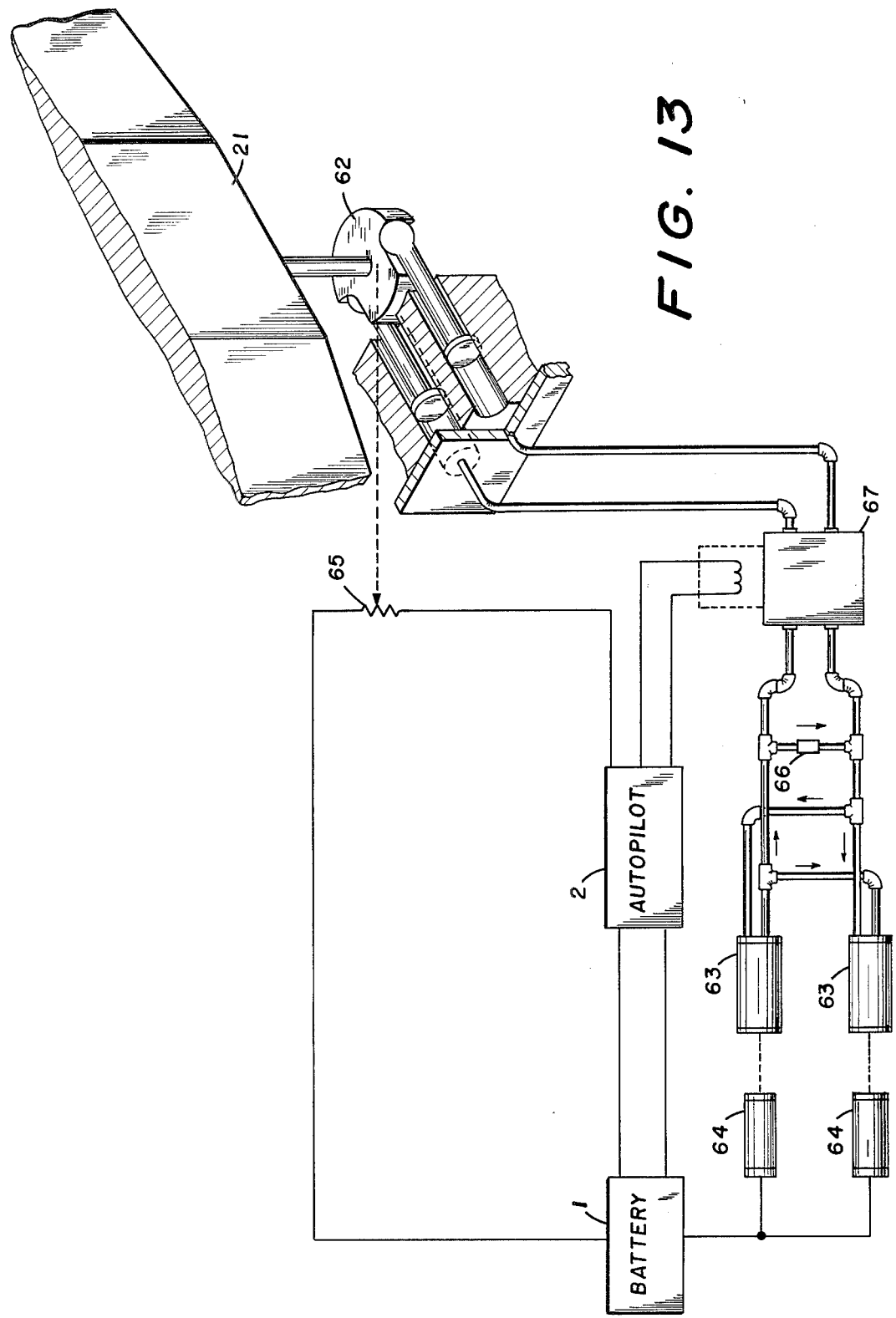

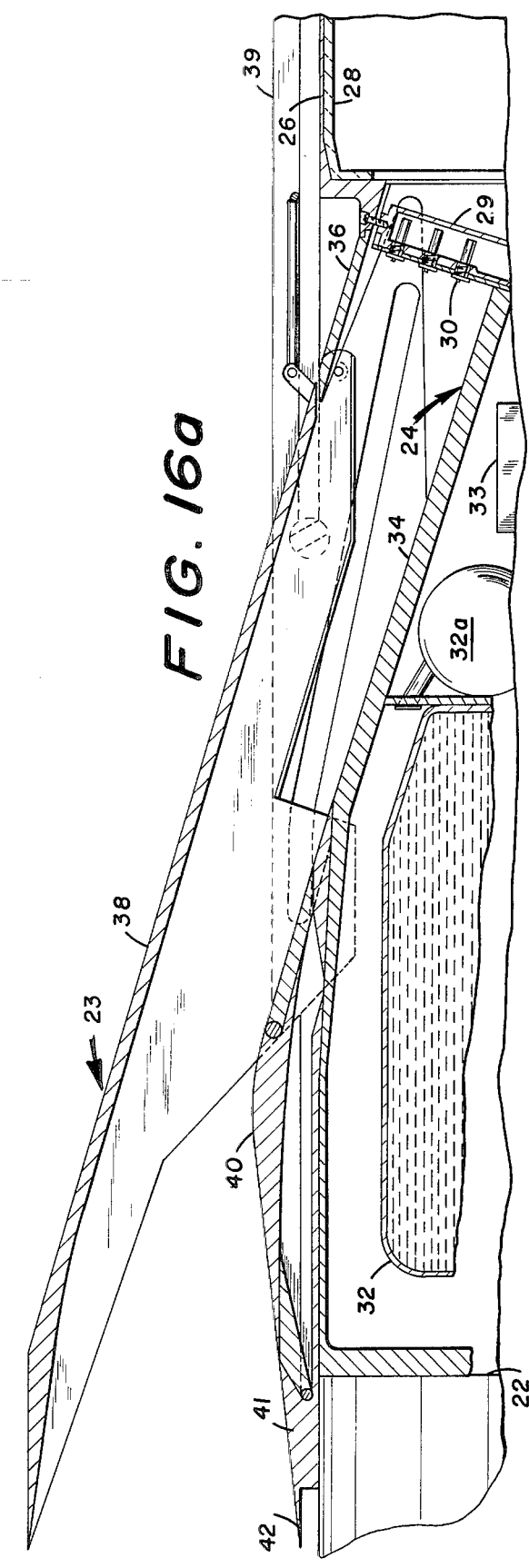
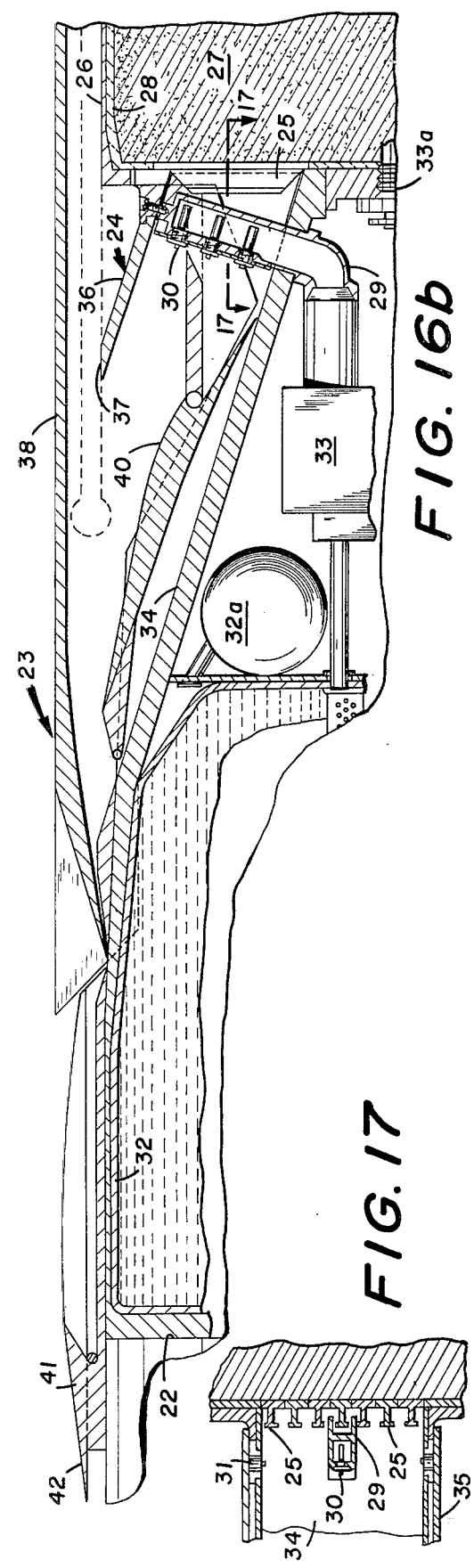
FIG. 16a
FIG. 16b
FIG. 17

INTEGRAL ROCKET RAMJET MISSILE

BACKGROUND AND OBJECTS OF THE INVENTION

The present invention relates generally to aerial vehicles and more particularly to an improved aerial vehicle which is initially accelerated after launching by an integral solid rocket booster and which, after booster burnout, will function as an air breathing liquid fueled ramjet.

One of the problems encountered in the design of an integral rocket-ramjet vehicle has been to provide means for conducting an adequate amount of ram air to the ramjet combustion chamber, which means would be compatible with the planned launching system. More specifically, it was found that a ram air scoop that was capable of capturing sufficient air to support ramjet combustion would be so large that the vehicle on which it was mounted could not be stowed in the limited space provided on the launcher.

One of the more important objects of the present invention, therefore, is to provide an integral rocket-ramjet vehicle wherein means are employed for assuring an adequate supply of ram air when the vehicle is operating as a ramjet but which will nevertheless be of such dimensions that the vehicle may be stowed in the limited space provided on the launcher.

Another object of the invention is to provide an integral rocket-ramjet vehicle wherein the casing that contains the grain of the solid rocket booster becomes the combustion chamber of the ramjet upon burnout of said grain.

A further object of the invention resides in the provision of an integral rocket-ramjet vehicle which has effective means for extending the ram air capturing scoops employed whereby air will be conducted to the ramjet combustion chamber for mixture with fuel therein.

Still another object of the invention is to provide, in a combination rocket-ramjet vehicle, improved distribution means for the ramjet liquid fuel carried by the vehicle.

As another object, the invention provides an aerial vehicle having a booster nozzle and improved means for allowing ejection of said nozzle upon burnout of the booster rocket grain.

Other objects of the invention not specifically mentioned hereinabove will become evident as the description proceeds.

SUMMARY OF THE INVENTION

The present invention is an aerial vehicle or missile which may be launched by known guided missile launching systems. More particularly, it is a two stage vehicle that is launched and accelerated by an integral solid booster rocket, the propellant grain chamber of which, after grain burnout and ejection of the booster nozzle employed, becomes the combustion chamber for an air-breathing liquid fueled ramjet. The vehicle carries guidance equipment and an electrical power source and, when manufactured for use as a guided missile, ordnance in its forward end portion. In the portion of the vehicle that extends from substantially its mid point to its aft end there are provided a liquid fuel storage, control and distribution system, extendible air scoops, the rocket grain-ramjet combustion chamber and casing, and the aft end fin and exhaust nozzle structures. The air scoops are so designed, as stated hereinabove, that they will be capable of supplying ramjet combustion but will be compatible with launcher clearances. The air scoop design is shown, described and claimed in U.S. Pat. No. 3,659,424, entitled Stowable Air Scoop, Albert S. Polk, Jr., inventor, assigned to the U.S. Government as represented by the Secretary of the Navy.

BRIEF DESCRIPTION OF THE DRAWINGS

FIG. 1 is a side elevation, partially broken away showing the vehicle constituting the invention as it would appear with the air scoops employed in extended positions for ramjet operation.

FIG. 2 is a longitudinal section, partially in elevation and partially broken away, showing the vehicle in its initial condition, i.e., with the air scoop retracted and the booster rocket and ejectable booster nozzle in their initial positions.

FIG. 3 is an aft end view of the vehicle as shown in FIG. 2, with the tail fins folded.

FIG. 4 is a view similar to FIG. 2 but with the vehicle in condition for ramjet operation.

FIG. 5 is an aft end view of the vehicle as shown in FIG. 4.

FIG. 9 is an enlarged detail section showing the air scoop actuator mechanism employed as it would appear in extended position.

FIG. 10 is a top plan view, partially broken away, showing the air scoop actuator mechanism in retracted position.

FIG. 11 is a detail section on the line 11—11 of FIG. 10.

FIG. 12 is a schematic view showing the hydraulic connections and portions of the electrical connections for the four fin actuating mechanisms employed.

FIG. 13 is an enlarged detail schematic showing one of the fin actuators and its hydraulic and electrical connections, parts of the fin and actuator having been broken away and shown in section.

FIG. 16a is an enlarged detail section showing one of the air scoop structures employed as it would appear extended.

FIG. 16b is a view similar to FIG. 16a but showing the air scoop structure retracted.

FIG. 17 is a detail section on the line 17—17 of FIG. 16b.

DETAILED DESCRIPTION OF THE INVENTION

Figure 6:
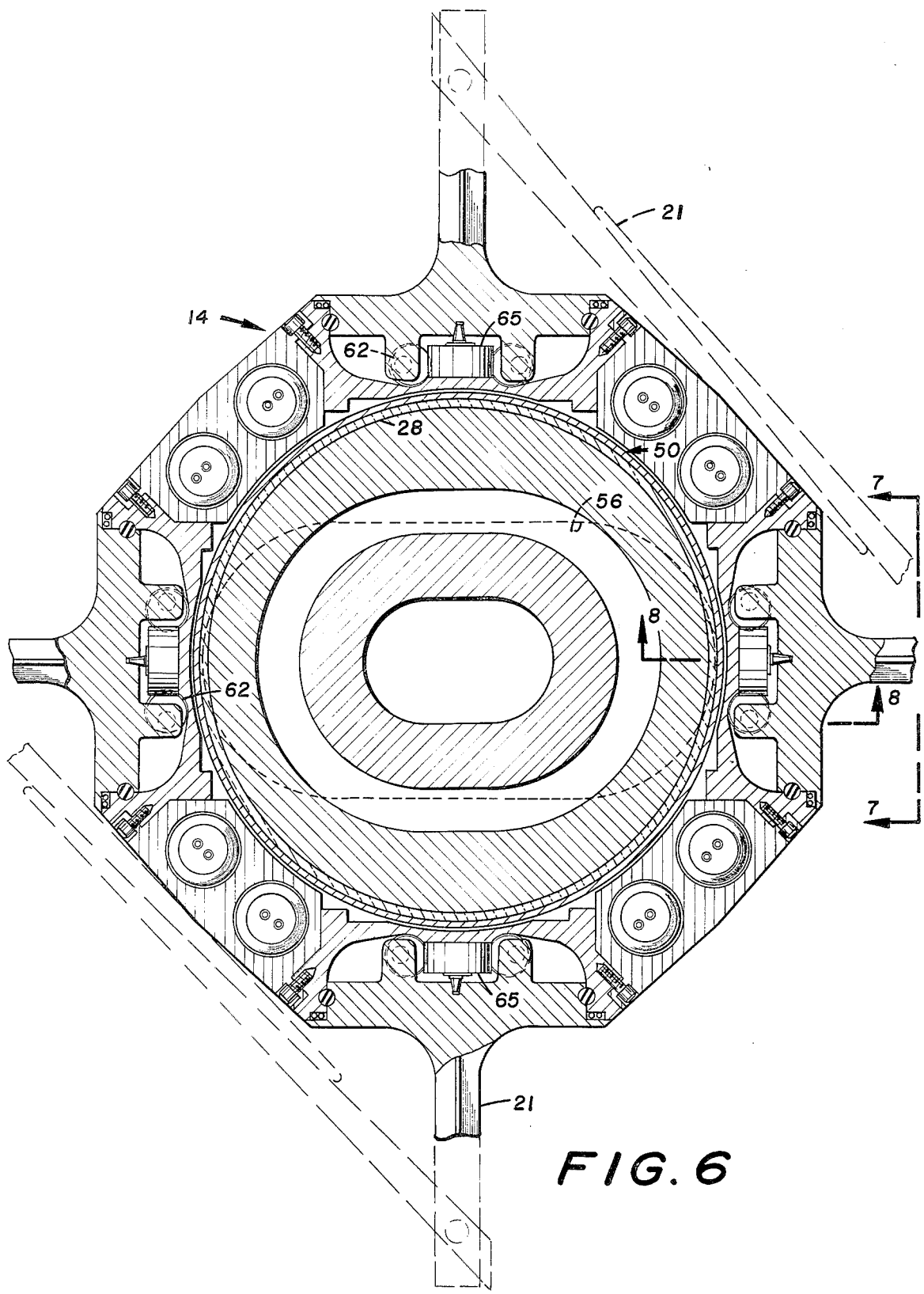
FIG. 6 is an enlarged detail section on the line 6—6 of FIG. 2.
Figure 7:
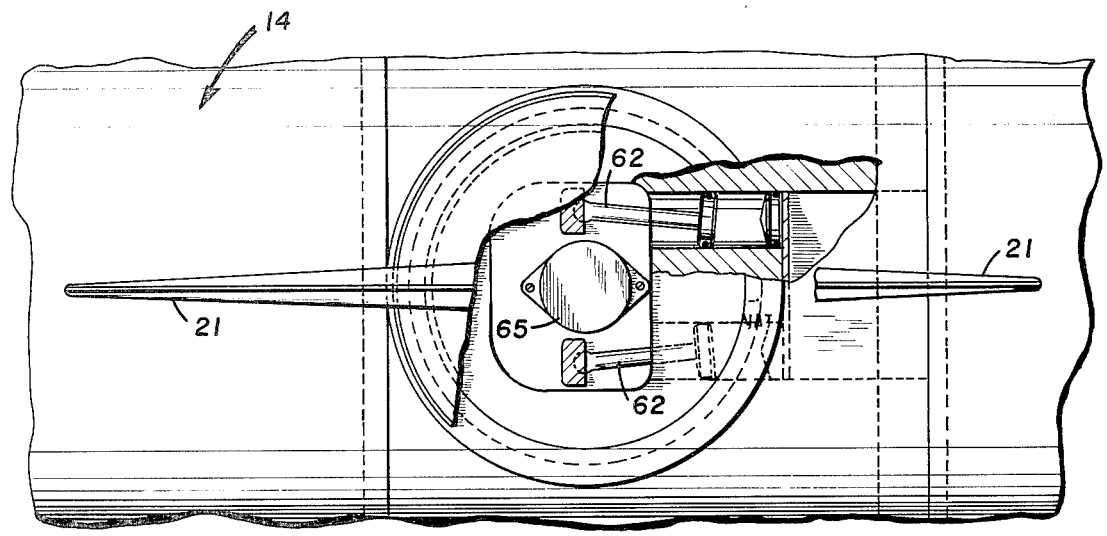
FIG. 7 is a detail section, partially in elevation, on the line 7—7 of FIG. 6 and showing a portion of the fin actuating mechanism.
Figure 8:
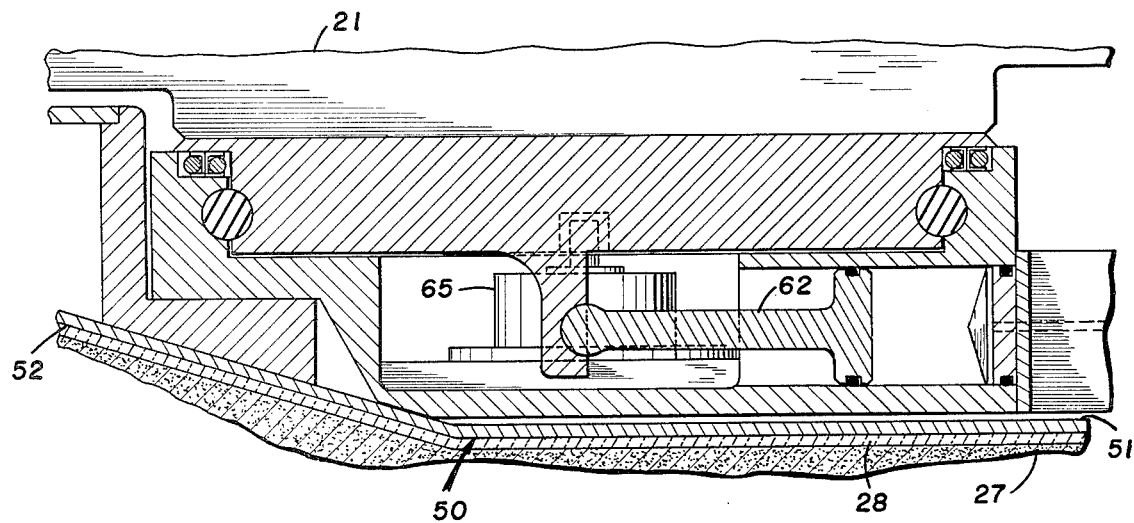
FIG. 8 is an enlarged detail section on the line 8—8 of FIG. 6.
Figure 14:
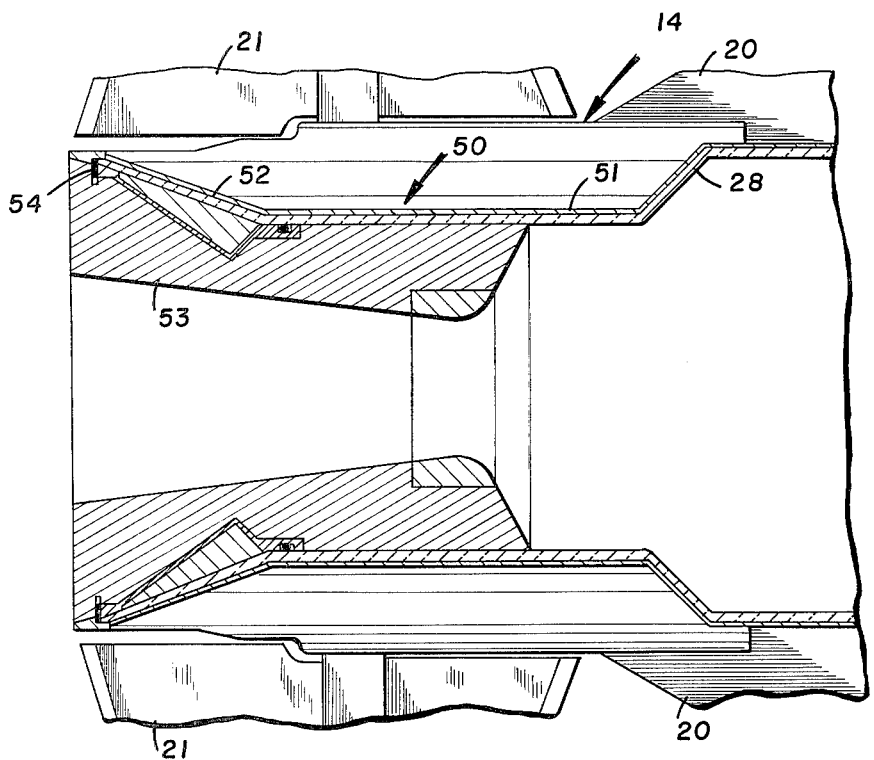
FIG. 14 is an enlarged axial section showing in greater detail the aft end portion of the vehicle with the ejectable booster nozzle in place but with the details of the fin actuators omitted.

Referring now more particularly to the drawings and first to FIGS. 1 through 5 thereof, the integral rocket-ramjet vehicle constituting the present invention comprises an airframe 10 having an ogive section 11, a forward section 12, a main body section 13 and a tail section 14. As seen in broken lines in FIG. 4, the ogive section 11 carries a radar seeker antenna 15 and the forward section 12 contains a warhead 16, a proximity fuze 17, batteries 18 and an autopilot 19. It should be understood that variations in design of the vehicle may dictate a different arrangement of components, or different components entirely, in the airframe sections. It should also be understood that the main body section 1 is of substantially greater length than as shown in FIGS. 1, 2 and 4, it having been necessary to break away portions of said section to permit proper illustration of the more significant parts of the invention. Mounted on the main body section and spaced 45 degrees apart thereabout are dorsal fins 20, and mounted on the tail section 14 and in alignment with the fins 20 are steering fins 21.

Formed in the forward end portion of the main body section 13, as seen in FIGS. 16a and 16b are diametrically oppositely disposed rectangular openings 22, the openings being located between adjacent pairs of the dorsal fins 20 and receiving portions of the retractable air scoop structures 23. The scoop structures 23 are identical, so that a description of one will suffice for both of them. They are shown in enlarged detail in FIGS. 9, 10, 11, 16a 16b and 17 and each include a throat member 24, of rectangular cross-section, which is mounted in one of the openings 22 and is open at its lower end to confront blow-out elements 25 (FIGS. 16b and 17) that are mounted in an opening in the forward end of a solid rocket casing 26 which forms a part of the airframe 10. The rocket grain is shown at 27 and a layer of insulation around said grain at 28.

Mounted in the lower end of the throat member 24 is a fuel discharge pipe 29 in which are mounted nozzles 30. The nozzle 30, together with nozzles 31 (FIG. 17) that are mounted in the side wall of the throat member 24, supply fuel to the rocket casing 26, which becomes the ramjet combustion chamber upon completion of burning of the grain 27, from a bladder tank 32 through a suitable fuel delivery system 33. An igniter for the solid rocket grain 27 is shown at 33a.

Referring to FIGS. 16a and 17, it will be seen that the throat member 24 has a relatively long inclined bottom wall 34, side walls 35, and a relatively short top wall 36 which has a beveled forward edge 37. Each of the scoop structures also includes a movable inlet, member 38 which is of inverted U-shape and has its rear end portion hingedly mounted to slide between rails of a track 39 on the outer surface of the airframe 10. The inlet member 38 has hingedly connected thereto a ramp element 40. The ramp element 40 is movable from an inoperative position (FIG. 16b) when the scoop inlet member is in its initially retracted position to an operative position (FIG. 16a) when said inlet member is extended. When in operative position the ramp element 40 cooperates with a fixed compression ramp 41, the latter terminating in a boundary layer splitter plate 42.

To effect extension of the scoop inlet members 38 of the scoop structures 23, explosive gas operated actuators are used. One of the actuators is shown at 43 in FIGS. 9, 10 and 11 and consists of telescoping cylindrical sections, the aftmost of which is pivotally connected to the airframe 10 by a yoke 44 and the forwardmost of which is attached to a yoke 45 on the movable inlet member 38. An explosive gas cartridge 46 is secured to the aftmost section of the actuator 43. An explosive charge 47 in the cartridge is initiated by an electrically fired squib 48 upon command from the missile's control apparatus in the forward section 12.

Although not shown in detail it should be understood that the wiring from the missile launcher to electrical apparatus in the missile, such as the igniter 33a, the squib 48 and the tail fin control apparatus (to be described hereinafter), will be housed in one or more of the dorsal fins 20.

Attention is now particularly directed to those views of the drawings that disclose more or less in detail the structure of the tail section 14 of the vehicle, namely, FIGS. 1, 6, 7, 8, 14 and 15. Schematics, which emphasize the hydraulic system but diagram portions of the electrical arrangement, constitute FIGS. 12 and 13.

Figure 15:
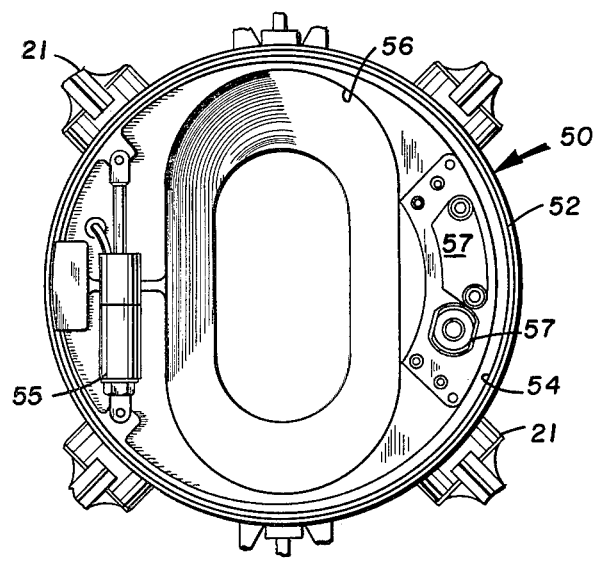
FIG. 15 is a detail end view showing the explosive powered retractor for retracting the booster nozzle retaining ring at the end of boost to allow ejection of said nozzle.

The tail section 14 includes a ramjet exhaust nozzle 50 which has a constricted portion 51 and a flared portion 52. The nozzle 50 is formed on the aft end of the solid rocket casing 26 that, as stated hereinabove, becomes the ramjet combustion chamber upon burnout of the rocket grain 27. Mounted in the flared portion 52 of the nozzle 50 is an ejectable booster nozzle 53. As shown in FIG. 15, the booster nozzle 53 is held in position in the flared portion 52 by a retaining ring 54 which is normally engaged in a groove in the flared portion 52 of the nozzle 50. Upon completion of the burning of the grain 27, an explosive powered retractor 55 is fired, by a signal from the control mechanism in the forward section 12 of the airframe 10, for contracting the retaining ring. When the retaining ring is contracted, the booster nozzle 53 will be ejected by residual pressure in the rocket casing (combustion chamber) 26. As also shown in FIG. 15, the booster nozzle 53 has an elliptical throat 56 and carries launcher-to-vehicle and magazine-to-vehicle contactors 57. Conductors (not shown) from these contactors are connected to a secondary connector (not shown) in the tail section 14 and eject with the nozzle 53. In order to protect the inner surface of the rocket casing 26 and the ramjet exhaust nozzle 50 from the effects of extremely high temperatures, the thermal protective coating 28 of suitable insulating material is employed.

To effect steering of the vehicle, the four steering fins 21 are employed. As shown partially in broken lines in FIG. 6, the fins 21 are of the folding type, i.e., they may be kept in folded positions during storage of the vehicle in a magazine or launcher, and erected automatically as the vehicle leaves the launcher. These fins are rocked by actuators 62 that are driven by hydraulic pumps 63. The pumps 63 are operated by electric motors 64 (FIG. 12). The fins are arranged symmetrically about the tail section 14 with the motors and pumps positioned in the constricted portion 51 of the ramjet nozzle 50.

Control of the movement of the fins 21 is accomplished by the above-mentioned actuators, motors and pumps in response to electric signals to an autopilot from electrical position feedback potentiometers 65 operated by rocking of said fins. FIGS. 12 and 13 illustrate schematically the electrical and hydraulic circuits employed, including in addition to the actuators 62 and motors 64, the pumps 63 and the potentiometers 65, pressure regulators 66, servo valves 67 and appropriate electrical and pneumatic connections.

In operation, the vehicle is first placed on a launcher and electrical connections made to the contactors 57 from said launcher and from the magazine (neither shown). The vehicle, when produced as a missile, as described, would be of such dimensions that it would be compatible with the U.S. Navy's Marks 11, 13, 22 and 26 guided missile launching systems.

While storage and during loading operations the retractable scoop structures 23 are maintained in their retracted positions, as shown in FIGS. 2 and 16b. When the vehicle is on the launcher rail and outside the magazine, and during pre-launch warm-up, said scoop structures are in extended positions, as shown in FIGS. 1, 4 and 16a. As previously explained, the scoop structures are extended by initiation of the explosive gas operated actuators 43, which initiation may be effected from a suitable control console (not shown). It should be pointed out that much less power is required to extend the scoop structures when the vehicle is on the launcher than when it is in flight, i.e., at the end of the boost. It is for this reason that it is considered desirable to accept the drag that will be produced by the extended scoop structures.

Launching of the vehicle is effected by ignition of the rocket grain 27 by completion of appropriate electric circuits from an electric power source to the igniter 33a. Burning of the grain 27 will move the vehicle from the launcher and accelerate it to supersonic speed, typically Mach 2.2 upon burnout of the booster rocket grain 27, the actuator 55 will be initiated for contracting the retaining ring 54, when the booster nozzle 53 will be jettisoned by residual pressure in the rocket casing 26. At the same time the blow-out elements 25 will be displaced from the inner ends of the scoop structures 23, by air flow passing through said structures, and jettisoned through the ramjet exhaust nozzle 50. When triggered by an appropriate signal, the fuel delivery system 33 will supply fuel from the bladder tank 32 to the nozzles 30 and 31 through the discharge pipes 29 in each of the diffusers defined by the scoop structures 23, high pressure gas from gas generators 32a having been forced between said bladder tank and its surrounding wall for contracting the tank and forcing fuel therefrom. As will be understood, fuel from the nozzles 30 and 31 will mix with air entering the scoop structure and will be ignited in the combustion chamber defined by the rocket casing, empty after grain burnout, the temperature within the chamber being high enough as a result of said grain burning to ignite the fuel-air mixture. As is well-known in the art, the products of combustion resulting from the burning of the fuel-air mixture will be discharged through the ramjet exhaust nozzle 50 and produce thrust for accelerating the vehicle to higher speeds. Typically, ramjet action will accelerate the vehicle (in the case of a missile) toward a target at a speed of approximately Mach 2.5. It should be understood, of course, that the speed of the vehicle will depend upon altitude and other factors.

From the above description it will be understood that the present invention provides an aerial vehicle that will combine in one airframe both rocket and ramjet capabilities and yet one that will satisfy the dimensional restraints of known guided missile launching systems, such as the U.S. Navy's Mark 13. As will be readily apparant, no effort has been made in the description and drawings to adhere to strict design specifications, as these will change as developments in the art progress. For example, it may be necessary to modify the relative amounts of the two fuels (liquid and solid) for optimum overall performance. Such a modification would require shifting the fuel tank forward or aft and corresponding rearrangement of the scoop structures. Such changes would, of course, have no effect on the basic design philosophy.

We claim:
1. An aerial vehicle comprising:
an airframe;
a rocket casing carried by the airframe and having a propellant therein;
an exhaust nozzle disposed at the aft end of the casing and having an annular groove formed in the inner surface thereof;
means for igniting the propellant in the casing;
a fuel tank carried by the airframe and having a second propellant therein;
air supply means carried on the airframe;
fuel delivery means connected between the tank and the solid rocket casing;
means carried by the airframe and being displaced upon burnout of the first-mentioned propellant to admit air from the air supply means to the rocket casing to mix with the propellant from the tank;
a displaceable booster nozzle disposed in the exhaust nozzle and having an annular groove formed in the outer surface thereof, the annular groove in the booster nozzle mating with the annular groove in the exhaust nozzle;
a retaining ring disposed in the annular groove formed in the booster nozzle and extending from said groove into locking engagement with the annular groove in the exhaust nozzle, thereby mounting the booster nozzle in the exhaust nozzle; and,
means connected to the retaining ring for inwardly displacing said retaining ring in order to constrict the ring and extract said ring from engagement with the annular groove in the exhaust nozzle, the booster nozzle being ejected from the exhaust nozzle by residual pressure in the casing on burnout of the propellant in the casing, the vehicle having been accelerated to a relatively high speed by the burning of the propellant in the casing, said casing becoming a combustion chamber on said burnout of the propellant therein and the air from said air supply means and the propellant from the tank being ignited by residual heat in the chamber formed by the casing for producing ramjet thrust at the exhaust nozzle for accelerating the vehicle to a relatively higher speed.

2. An aerial vehicle as recited in claim 1,
wherein the air supply means includes a retractable scoop structure having an inlet member movable from a retracted position adjacent the airframe to an extended position projecting from the airframe.

3. An aerial vehicle as recited in claim 2,
including additionally an explosive gas operated actuator for extending the movable inlet member.

4. An aerial vehicle as recited in claim 2,
wherein the displaceable means comprises a blowout element in the retractable scoop structure.

5. The invention as recited in claim 1 wherein the rocket casing includes a constricted portion near its aft end,
steering fins on the aft end portion of the airframe, and actuators for said fins,
said actuators being mounted in the constricted portions.

6. The invention as recited in claim 1,
wherein the air supply means comprises retractable scoop structures mounted diametrically opposite each other on the airframe and each having an inlet member movable from a retracted position to permit loading of the vehicle on the launcher to an extended position on the airframe, and explosive gas operated means for moving the movable inlet members to extended positions.

7. The invention as recited in claim 6, wherein the displaceable means comprises a plurality of blow-out elements mounted in each of the retractable scoop structures.

8. The combination recited in claim 1 including additionally means for forcing propellant from the fuel tank into the combustion chamber upon burnout.

9. The combination recited in claim 1 wherein the fuel tank comprises a bladder of flexible material, and including additionally means for forcing gas about the bladder for forcing propellant from the tank into the combustion chamber upon burnout.

10. The invention as recited in claim 1 wherein said means for displacing the retaining ring comprises an explosive powered retractor being connected to the retaining ring at two points thereon, actuation of the retractor producing an inwardly directed force on the two points of the ring to cause the ring to constrict and to disengage from the annular groove formed in the exhaust nozzle, the ring constricting into the annular groove formed in the booster nozzle, the last-mentioned groove being sufficiently deeply cut into the outer surface of said booster nozzle to fully receive said retaining ring therein.

* * * * *